United States Patent
Ueda (10) Patent No.: US 6,793,573 B2
(45) Date of Patent: Sep. 21, 2004

(54) AIR CONDITIONING SYSTEMS FOR VEHICLES AND VEHICLES COMPRISING SUCH AIR CONDITIONING SYSTEMS

(75) Inventor: Katsumi Ueda, Isesaki (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 10/457,476

(22) Filed: Jun. 10, 2003

(65) Prior Publication Data

US 2003/0233843 A1 Dec. 25, 2003

(30) Foreign Application Priority Data

Jun. 20, 2002 (JP) ........................................ 2002/179784

(51) Int. Cl.[7] ................................................. B60H 1/32
(52) U.S. Cl. ...................... 454/156; 251/248; 251/250.5
(58) Field of Search ................................ 454/121, 156, 454/159, 160, 161; 251/248, 250.5

(56) References Cited

U.S. PATENT DOCUMENTS

| | | | |
|---|---|---|---|
| 3,591,127 A | * | 7/1971 | Luger et al. .................. 251/36 |
| 5,867,996 A | | 2/1999 | Takano et al. |
| 6,192,155 B1 | | 2/2001 | Fan |
| 6,217,297 B1 | | 4/2001 | Tsumagari et al. |
| 6,230,507 B1 | | 5/2001 | Ban et al. |
| 6,234,769 B1 | | 5/2001 | Sakai et al. |
| 6,247,899 B1 | | 6/2001 | Ban et al. |
| 6,287,081 B1 | | 9/2001 | Tamegai et al. |
| 6,334,755 B1 | | 1/2002 | Coudray et al. |
| 6,375,436 B1 | | 4/2002 | Irie et al. |
| 6,443,712 B2 | | 9/2002 | Sakai et al. |
| 6,543,243 B2 | | 4/2003 | Mohrmann et al. |
| 2001/0008148 A1 | * | 7/2001 | Ito et al. ................. 137/625.46 |
| 2003/0053916 A1 | | 3/2003 | Terauchi |
| 2003/0136138 A1 | | 7/2003 | Tsuboi et al. |
| 2003/0152467 A1 | | 8/2003 | Higashiyama et al. |

FOREIGN PATENT DOCUMENTS

| | | |
|---|---|---|
| EP | 1312494 | 5/2003 |
| JP | 529153 | 6/1993 |

* cited by examiner

Primary Examiner—Harold Joyce
(74) Attorney, Agent, or Firm—Baker Botts L.L.P.

(57) ABSTRACT

An air conditioning system for a vehicle includes a first air path formed within an air duct, and a second air path formed within the air duct. The air conditioning system also includes an air mixing damper for adjusting a first amount of air, which flows within the first air path, and a second amount of air, which flows within the second air path. The air mixing damper includes a plurality of convex portions, and a plurality of concave portions, each of which concave portions is positioned between adjacent pairs of the plurality of convex portions. The air conditioning system also includes a drive mechanism for driving the air mixing damper. The drive mechanism includes a first gear engaging a portion of the plurality of convex portions and a portion of the plurality of concave portions. The drive mechanism also includes a shaft coupled operationally to the first gear, and an end of the shaft is positioned outside the air duct. Moreover, the drive mechanism includes a second gear coupled operationally to the end of the shaft, and a sector gear engaging the second gear. For example, a gear ratio of the second gear to the sector gear may be greater than or equal to 3:1.

6 Claims, 8 Drawing Sheets

AIR CONDITIONING SYSTEMS FOR VEHICLES AND VEHICLES COMPRISING SUCH AIR CONDITIONING SYSTEMS

BACKGROUND OF THE INVENTION

1. Field of the Invention

The present invention relates to generally to air conditioning systems for vehicles and vehicles comprising such air conditioning systems. In particular, the present invention is directed towards air conditioning systems and vehicles, in which a sector gear is used to increase the stroke length of an air mixing damper of the air conditioning system, without increasing the size of the air conditioning system.

2. Description of Related Art

Figure 7:
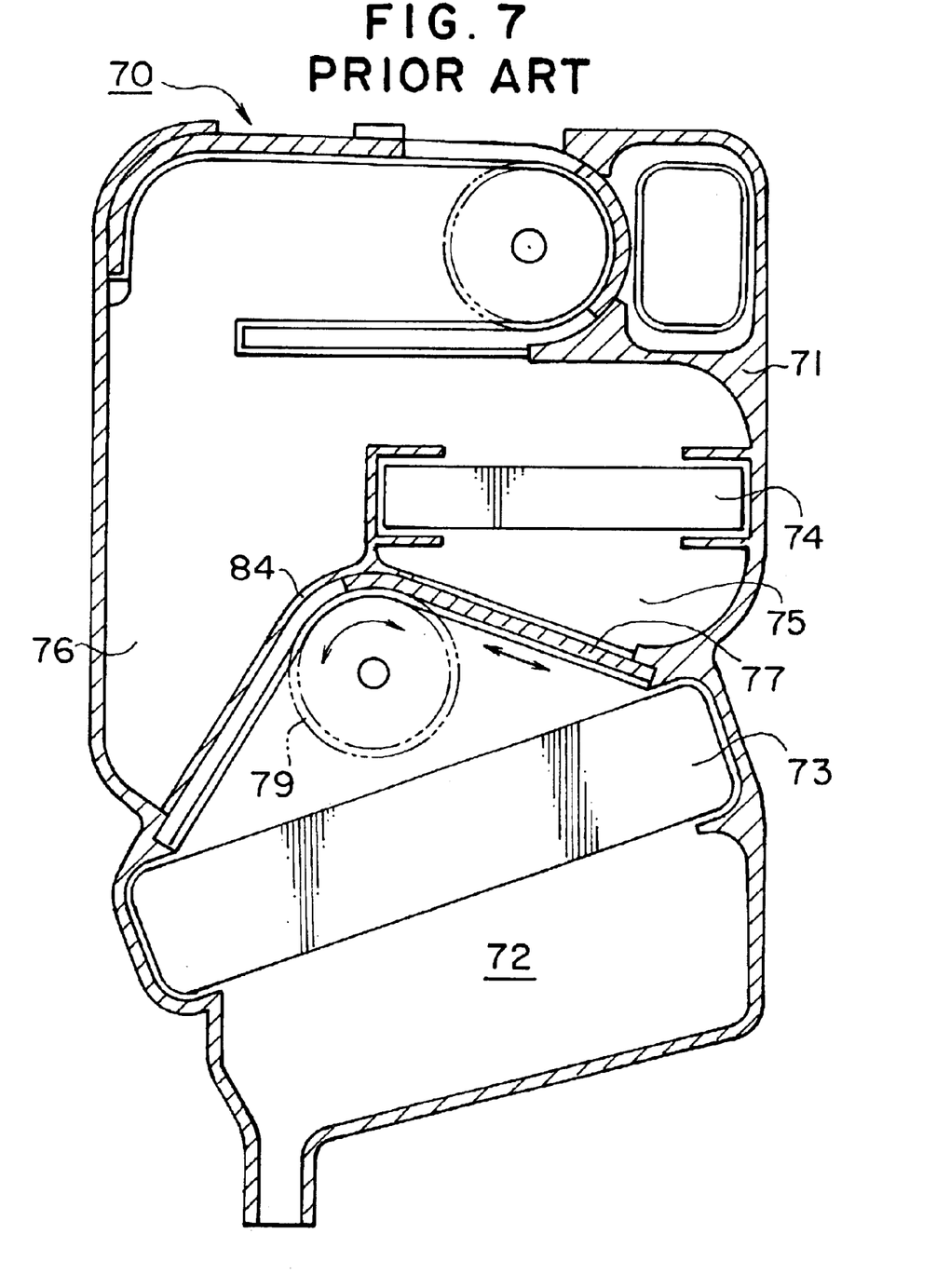
FIG. 7 is a cross-sectional view of a known air conditioning system.
Figure 8:
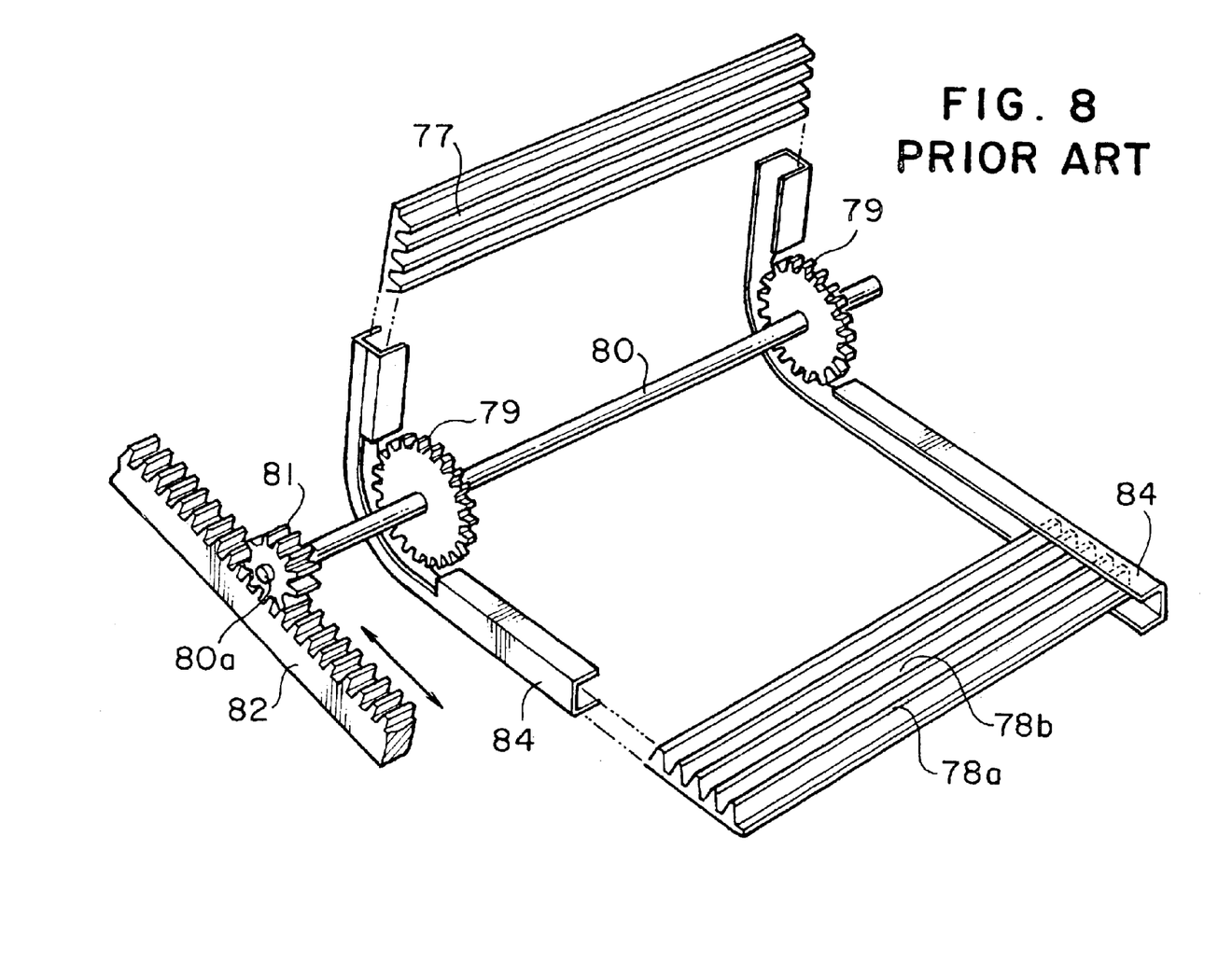
FIG. 8 is an enlarged, perspective view of a drive mechanism for driving an air mixing damper of the air conditioning system of FIG. 7, in which only portions of the air mixing damper are depicted, so as not to obscure the underlying structure of the drive mechanism.
Figure 9:
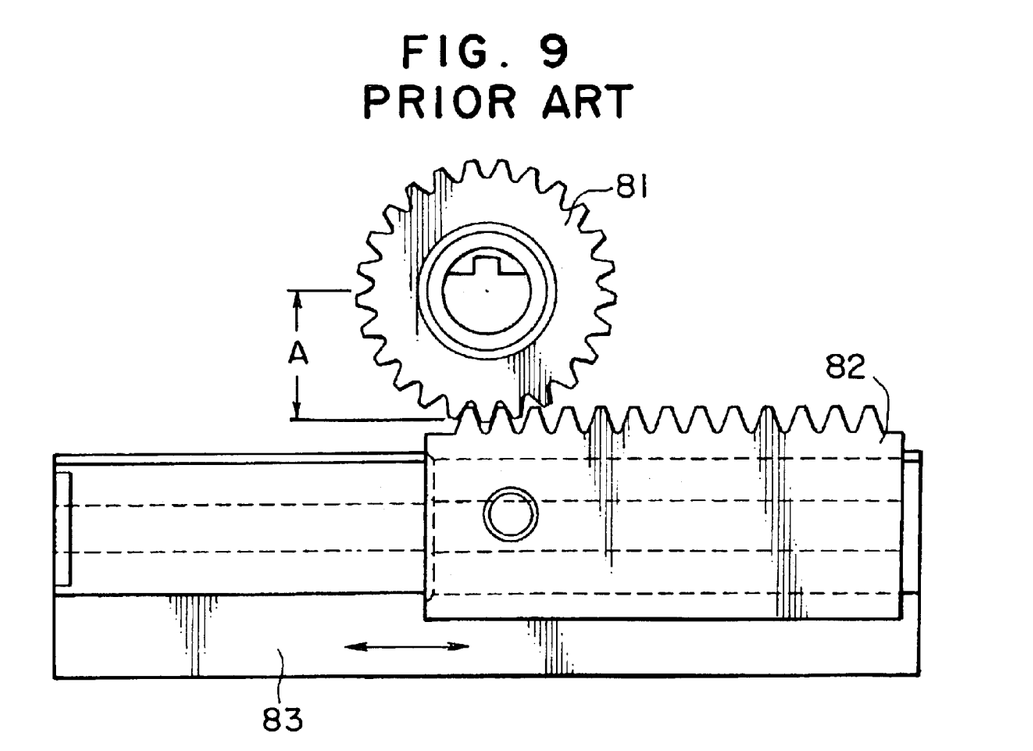
FIG. 9 is an enlarged, side view of a gear and a rack used in the air conditioning system of FIG. 7.

Referring to FIGS. 7–9, a known air conditioning system 70 for a vehicle (not shown), such as the air conditioning system described in EP1312494A1, includes a casing 71, and an air duct 72 including a first air path 75 and a second air path 76 formed within casing 71. Air conditioning system 70 also includes an evaporator 73 and a heater 74 positioned within air duct 72. Moreover, first air path 75 guides air which passes through evaporator 73 to heater 74, and a second air path 76 guides air which passes through evaporator 73 around heater 74. Air conditioning system 70 also includes a flexible, plate-type air mixing damper 77 positioned between evaporator 73 and heater 74 for adjusting the amount of air which flows within first air path 75 and the amount of air which flows within second air path 76.

Referring to FIG. 8, air mixing damper 77 includes a plurality of convex portions 78a, and plurality of concave portions 78b positioned between adjacent pairs of convex portions 78a. Air conditioning system 70 also includes a drive mechanism (not numbered). The drive mechanism includes plurality of first circular gears 79 which engage concave portions 78b and convex portions 78a. First circular gears 79 are mounted on a shaft 80, and an end portion 80a of shaft 80 projects outside casing 71. The drive mechanism also includes a second circular gear 81 mounted on end portion 80a, and a rack 82 or a third circular gear (not shown) connected to a wire (not shown). Rack 82 or the third circular gear engages second circular gear 81. Air conditioning system 70 also may include a plurality of damper guides 84, and air mixing damper 77 moves along damper guides 84.

Referring to FIG. 9, when a driver or a passenger of the vehicle moves a lever (not shown) for adjusting an interior temperature of the vehicle from a first position to a second position, rack 82 moves in a first direction along a base 83 via the wire. When rack 82 moves along base 83, second circular gear 81, shaft 80, and first circular gears 79 rotate, and air mixing damper 77 moves along damper guides 84. Referring again to FIG. 8, when air mixing damper 77 moves along damper guides 84, air mixing damper 77 adjusts the amount of air which flows within first air path 75 and the amount of air which flows within second air path 76. Because air mixing damper 77 is a plate-type air mixing damper, and the movement of air mixing damper 77 adjusts the amount of air which flows within first air path 75 and the amount of air which flows within second air path 76, air conditioning system 70 may be smaller than known air conditioning systems which use a rotary-type air mixing damper. Specifically, when a rotary-type air mixing damper is used, the size of the air duct is selected, such that the rotary-type air mixing damper rotates within the air duct without contacting the casing of the air conditioning system.

In air conditioning 70, the stroke length of rack 82 depends on the stroke length of the lever, e.g., increasing the stroke length of the lever increases the stroke length of rack 82, and the stroke length of air mixing damper 77 depends on the stroke length of rack 82, e.g., increasing the stroke length of rack 82 increases the stroke length of air mixing damper 77. A control panel of the vehicle includes the lever and a plurality of other components, e.g., a plurality of buttons for controlling a radio, a tape player, and a compact disc player; a plurality of buttons for selecting a mode for dispensing cooled or heated air into the interior of the vehicle; or the like. Consequently, the stroke length of the lever is limited by the size of the control panel and the amount of space occupied by these other components of the control panel. As such, it may be impractical to increase the stroke length of air mixing damper 77 by increasing the stroke length of the lever.

Decreasing the diameter of second circular gear 81 also increases the stroke length of air damper 77. Nevertheless, decreasing the diameter of second circular gear 81 also increases the amount of force needed to move the lever from the first position to the second position. Referring to FIG. 9, increasing a fulcrum distance A between the portions of second circular gear 81 which engage rack 82 and the rotational center of second circular gear 81 decreases the amount of force needed to moved the lever from the first position to the second position. Nevertheless, increasing fulcrum distance A also increases the diameter of second circular gear 81.

SUMMARY OF THE INVENTION

Therefore, a need has arisen for air conditioning systems which overcome these and other shortcomings of the related art. A technical advantage of the present invention is that the stroke length of the air mixing damper may be increased without increasing the size of the air condition system relative to the size of known air conditioning systems. Specifically, a sector gear is used to increase the stroke length of the air mixing damper.

According to an embodiment of the present invention, an air conditioning system for a vehicle comprises a first air path formed within an air duct, and a second air path formed within the air duct. The air conditioning system also comprises an air mixing damper for adjusting a first amount of air, which flows within the first air path, and a second amount of air, which flows within the second air path. The air mixing damper comprises a plurality of convex portions, and a plurality of concave portions, each of which concave portions is positioned between adjacent pairs of the plurality of convex portions. The air conditioning system also comprises a drive mechanism for driving the air mixing damper. The drive mechanism comprises at least one first gear engaging at least a portion of the plurality of convex portions and at least a portion of the plurality of concave portions. The drive mechanism also comprises a shaft coupled operationally to the at least one first gear, and at least one end of the shaft is positioned outside the air duct. Moreover, the drive mechanism comprises a second gear coupled operationally to the at least one end of the shaft, and a sector gear engaged with the second gear. For example, a gear ratio of the second gear to the sector gear may be at least 3:1.

According to another embodiment of the present invention, a vehicle comprises an air conditioning system. The air conditioning system comprises a first air path formed within an air duct, and a second air path formed within the air duct. The air conditioning system also comprises an air mixing damper for adjusting a first amount of air, which flows within the first air path, and a second amount of air, which flows within the second air path. The air mixing damper comprises a plurality of convex portions, and a plurality of concave portions, each of which concave portions is positioned between adjacent pairs of the plurality of convex portions. The air conditioning system also comprises a drive mechanism for driving the air mixing damper. The drive mechanism comprises at least one first gear engaging at least a portion of the plurality of convex portions and at least a portion of the plurality of concave portions. The drive mechanism also comprises a shaft coupled operationally to the at least one first gear, and at least one end of the shaft is positioned outside the air duct. Moreover, the drive mechanism comprises a second gear coupled operationally to the at least one end of the shaft, and a sector gear engaged with the second gear. For example, a gear ratio of the second gear to the sector gear may be at least 3.1.

Other objects, features, and advantages will be apparent to persons of ordinary skill in the art from the following detailed description of the invention and the accompanying drawings.

BRIEF DESCRIPTION OF THE DRAWINGS

For a more complete understanding of the present invention, the needs satisfied thereby, and the objects, features, and advantages thereof, reference now is made to the following description taken in connection with the accompanying drawings.

DETAILED DESCRIPTION OF PREFERRED EMBODIMENTS

Preferred embodiments of the present invention and their features and advantages may be understood by referring to FIGS. 1–6, like numerals being used for like corresponding parts in the various drawings.

Figure 1:
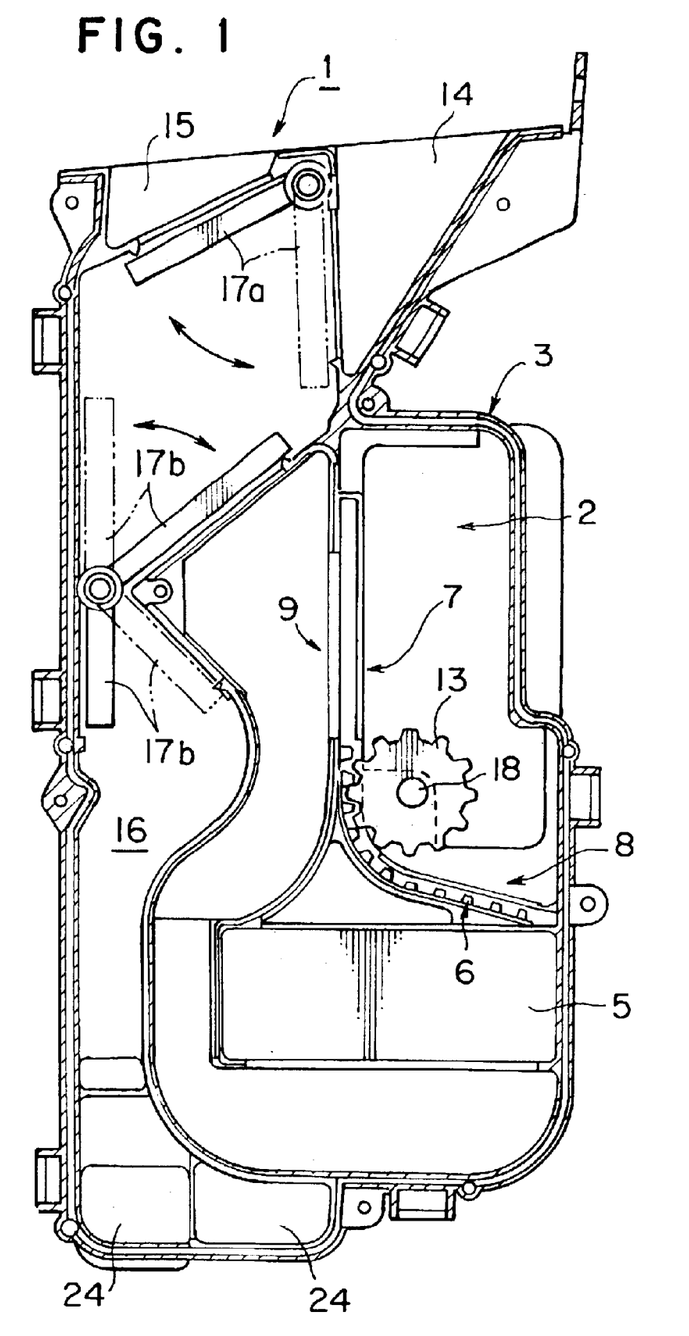
FIG. 1 is a cross-sectional view of an air conditioning system according to an embodiment of the present invention.
Figure 2:
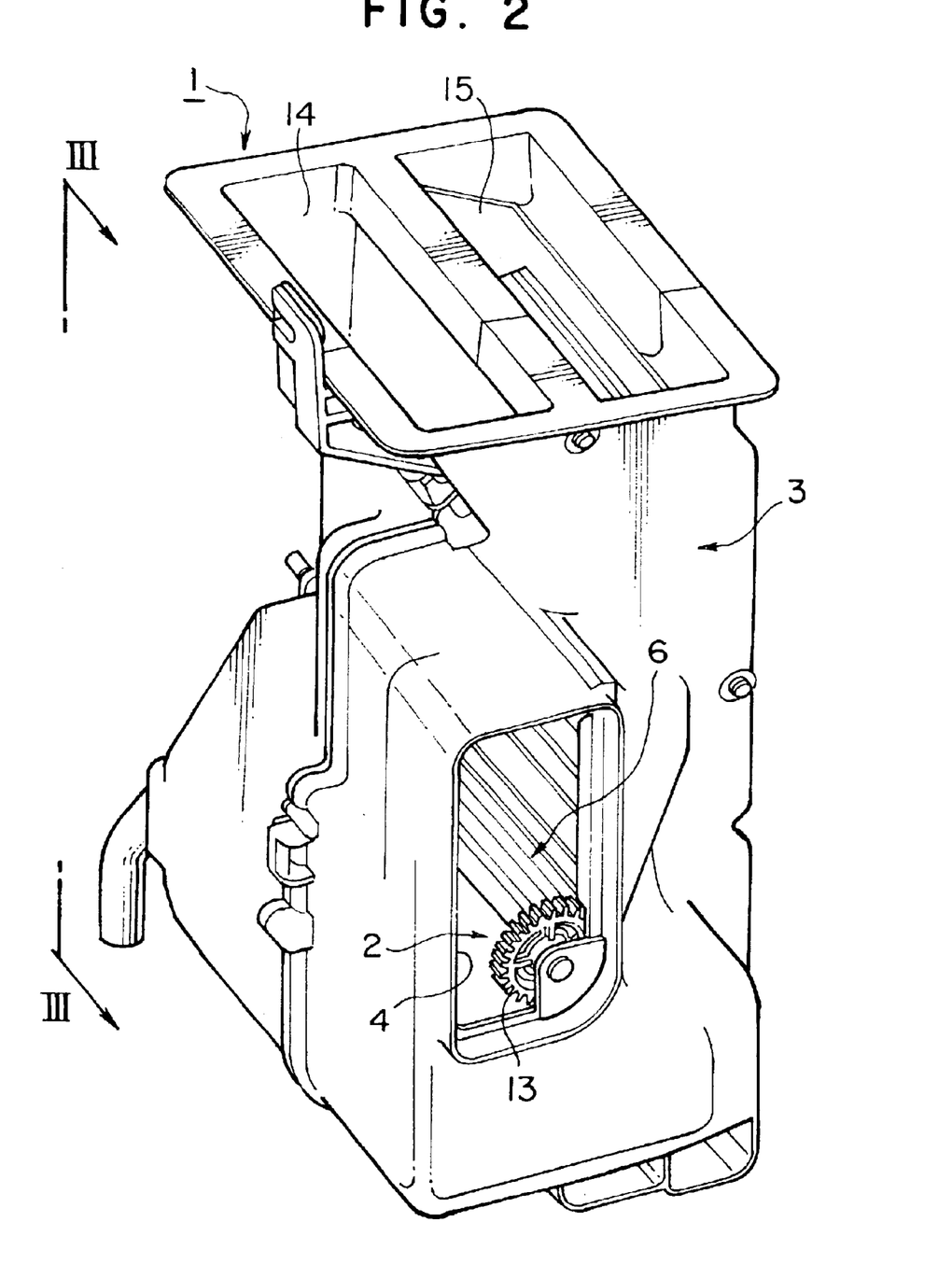
FIG. 2 is a perspective view of the air conditioning system of FIG. 1.
Figure 3:
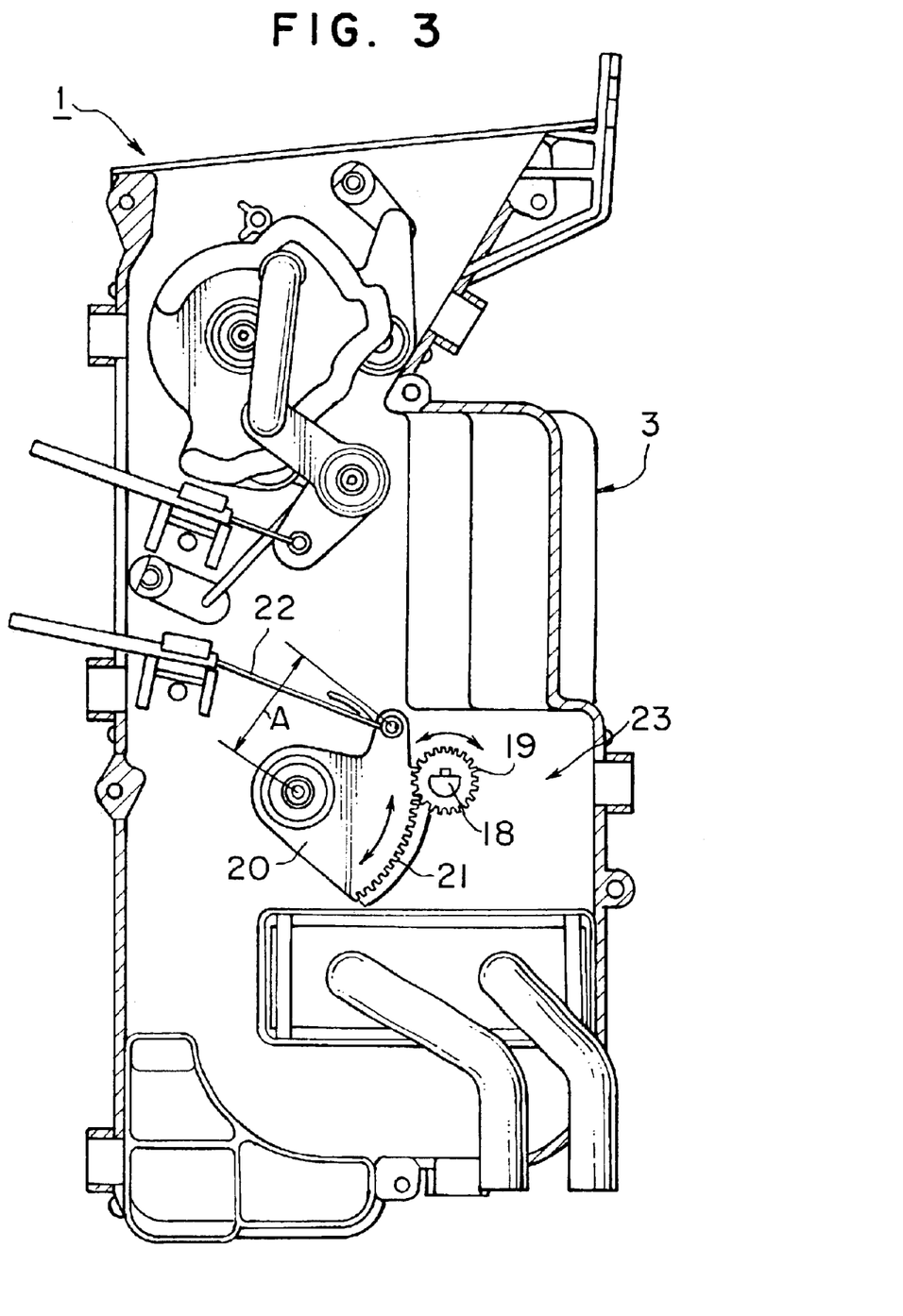
FIG. 3 is a cross-sectional view of the air conditioning system of FIG. 2 along line III—III.

FIGS. 1–3 depict an air conditioning system 1 for a vehicle (not shown) according to an embodiment of the present invention. Air conditioning system 1 may comprise a casing 3, and an air duct 2 comprising a first air path 8 and a second air path 9 formed within casing 1. Air conditioning system 1 also may comprise a suction port 4 formed through casing 3, and suction port 4 may open into air duct 2. Moreover, air which passes through an evaporator (not shown) may flow into air duct 2 via suction port 4. Air conditioning system 1 also may comprise a heater 5 positioned within in air duct 2, and an air mixing damper 6, e.g., a slide-type air mixing damper comprising a plate 12 which is flexible in a longitudinal direction, positioned between heater 5 and suction port 4. Moreover, first air path 8 guides air which passes through the evaporator to heater 5, and a second air path 9 guides air which passes through the evaporator around heater 5. The amount of air which flows within first air path 8 and the amount of air which flows within second air path 9 may be adjusted by sliding air mixing damper 6 along a guide path 7.

During the operation of air conditioning system 1, the air is discharged into the interior of vehicle via one or more air discharge ports, e.g., a DEFROST-mode air discharge port 14, a VENT-mode air discharge port 15, and a FOOT-mode air discharge port 24. The amount of air which is discharged via DEFROST-mode air discharge port 14 relative to the amount of air which is discharged via VENT-mode air discharge port 15 may be adjusted by a VENT-DEFROST damper 17a. Similarly, the amount of air discharged by FOOT-mode air discharge port 24 via an air path 16 relative to the amount of air discharged by DEFROST-mode air discharge port 14 and VENT-mode air discharge port 15 may be adjusted by a FOOT damper 17b.

Figure 4:
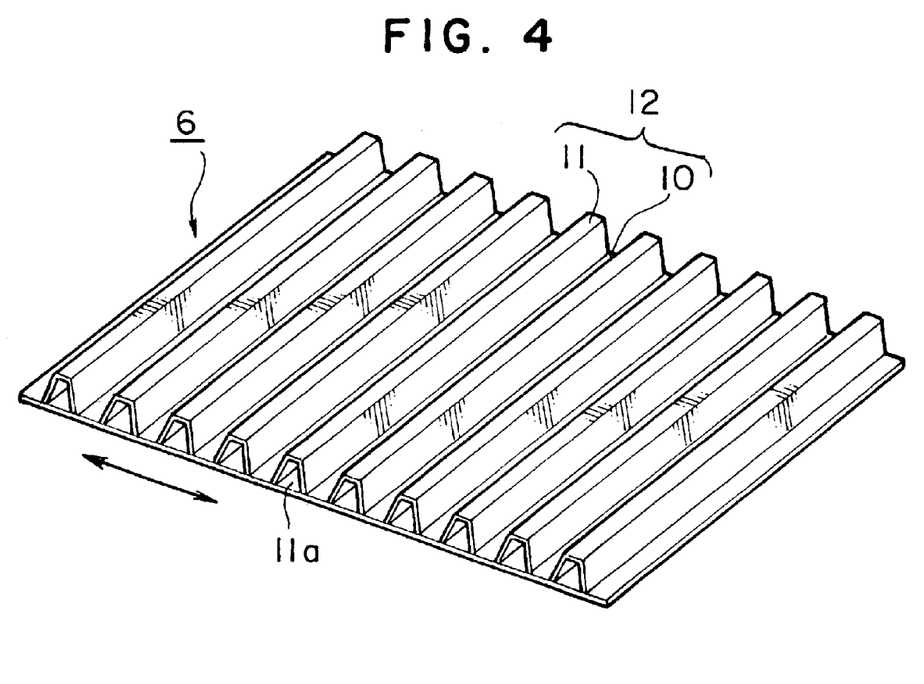
FIG. 4 is an enlarged, perspective view of an air mixing damper of the air conditioning system of FIG. 1.
Figure 5:
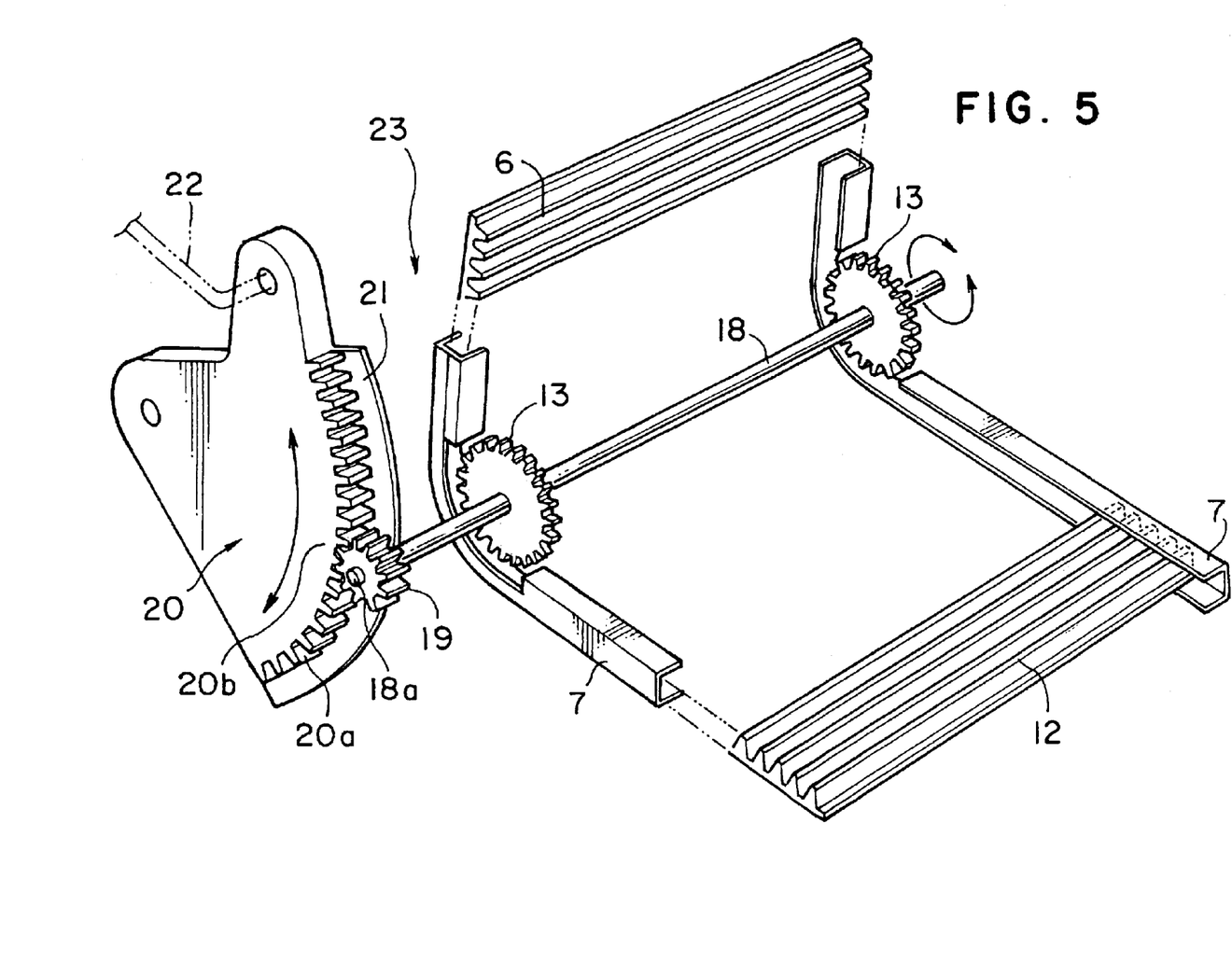
FIG. 5 is an enlarged, perspective view of a drive mechanism for driving the air mixing damper of FIG. 4, in which only portions of the air mixing damper are depicted, so as not to obscure the underlying structure of the drive mechanism.
Figure 6:
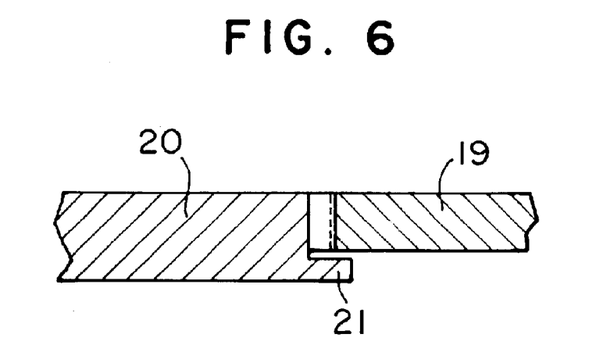
FIG. 6 is, a partial, enlarged, cross-sectional view of a pair of gears of the air conditioning system of FIG. 1.

Referring to FIGS. 4–6, plate 12 of air mixing damper 6 may comprise a plurality of convex portions 11, and plurality of concave portions 10 positioned between adjacent pairs of convex portions 11. In an embodiment, each convex portion 11 may comprise a hollow portion 11a for decreasing the weight of air mixing damper 6. Air conditioning system 1 also may comprise a drive mechanism 23 for driving air mixing damper 6. Drive mechanism 23 may comprise a plurality of first gears 13, e.g., a plurality of first circular gears, which engage concave portions 10 and convex portions 11 of air mixing damper 6. First gears 13 may be mounted on a shaft 18, and an end portion 18a of shaft 18 projects outside air duct 2 and casing 3. Drive mechanism 23 also may comprise a second gear 19, e.g., a second circular gear, mounted on end portion 18a, and a sector gear 20 which engages second gear 19. A sector gear may be defined as a toothed device resembling a portion of a gear wheel containing the center bearing and a portion of the rim with its teeth.

Sector gear 20 may comprise a plurality of gear teeth 20a formed along a curved portion 20b of sector gear 20, and a collar 21 which extends beyond curved portion 20b of sector gear 20. Collar 21 may prevent second gear 19 from disengaging from sector gear 20. Air conditioning system 1 also may comprise a wire 22. A first end of wire 22 may be connected to sector gear 20, and a second end of wire 22 may be connected to a lever (not shown) for adjusting an interior temperature of the vehicle. Specifically, when a driver or a passenger of the vehicle moves the lever from a first position to a second position, sector gear 20 rotates via wire 22. When sector gear 20 rotates, second gear 19, shaft 18, and first gears 13 also may rotate, and air mixing damper 6 may slide along guide path 7 to adjust the amount of air, which flows within first air path 8, and the amount of air, which flows within second air path 9.

In an embodiment of the present invention, a gear ratio of second gear 19 to sector gear 20 may be greater than or equal to about 3:1, such that the angular speed of second gear 19 may be at least three times greater than the angular speed of sector gear 20. For example, the gear ratio of second gear 19 to sector gear 20 may be about 4:1. Selecting the gear ratio of second gear 19 to sector gear 20 greater than or equal to about 3:1 allows for the stroke length of air mixing damper 6 to increase without substantially increasing the rotational range of sector gear 20. Nevertheless, when the gear ratio of second gear 19 to sector gear 20 is less than about 3:1, sector gear 20 may interfere with other components of air conditioning system 1 when sector gear 20 rotates.

In this embodiment of the present invention, because sector gear 20 is used to drive second gear 19, the size of drive mechanism 23 may be reduced and may be less than the size of known drive mechanisms which use a circular gear or a rack to drive the second gear. Moreover, the stroke length of air mixing damper 6 may be increased without having to increase the stroke length of the lever.

While the invention has been described in connection with preferred embodiments, it will be understood by those skilled in the art that variations and modifications of the preferred embodiments described above may be made without departing from the scope of the invention. Other embodiments will be apparent to those skilled in the art from a consideration of the specification or from a practice of the invention disclosed herein. It is intended that the specification and the described examples are consider exemplary only, with the true scope of the invention indicated by the following claims.

What is claimed is:

1. An air conditioning system for a vehicle comprising:

a first air path formed within an air duct;

a second air path formed within the air duct;

an air mixing damper for adjusting a first amount of air, which flows within the first air path, and a second amount of air, which flows within the second air path, wherein the air mixing damper comprises:
  a plurality of convex portions; and
  a plurality of concave portions, each of which is positioned between adjacent pairs of the plurality of convex portions; and a drive mechanism for driving the air mixing damper, wherein the drive mechanism comprises:
  at least one first gear engaging at least a portion of the plurality of convex portions and at least a portion of the plurality of concave portions;
  a shaft coupled operationally to the first gear, wherein at least one end of the shaft is positioned outside the air duct;
  a second gear coupled operationally to the at least one end of the shaft; and
  a sector gear engaging the second gear;
wherein the sector gear comprises a collar for preventing the second gear from disengaging from the sector gear.

2. The air conditioning system of claim 1, wherein the at least one first gear is mounted on the shaft, and the second gear is mounted on the shaft.

3. The air conditioning system of claim 1, wherein a gear ratio of the second gear to the sector gear is at least about 3:1.

4. A vehicle comprising:

An air conditioning system wherein the air conditioning system comprises:
  a first air path formed within an air duct;
  a second air path formed within the air duct;
  an air mixing damper for adjusting a first amount of air, which flows within the first air path, and a second amount of air, which flows within the second air path, wherein the air mixing damper comprises:
    a plurality of convex portions; and
    a plurality of concave portions, each of which is positioned between adjacent pairs of the plurality of convex portions; and
  a drive mechanism for driving the air mixing damper, wherein the drive mechanism comprises:
    at least one first gear engaging at least a portion of the plurality of convex portions and at least a portion of the plurality of concave portions;
    a shaft coupled operationally to the first gear, wherein at least one end of the shaft is positioned outside the air duct;
    a second gear coupled operationally to the at least one end of the shaft; and
    a sector gear engaging the second gear;
wherein the sector gear comprises a collar for preventing the second gear from disengaging from the sector gear.

5. The vehicle of claim 4, wherein the at least one first gear is mounted on the shaft, and the second gear is mounted on the shaft.

6. The vehicle of claim 4, wherein a gear ratio of the second gear to the sector gear is at least about 3:1.

* * * * *